UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD CO., OF NEW YORK, N. Y.

UREA DERIVATIVE AND PROCESS OF MAKING SAME.

SPECIFICATION forming part of Letters Patent No. 675,627, dated June 4, 1901.

Application filed December 27, 1900. Serial No. 41,248. (No specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in Urea Compounds and Processes of Making Same; and we hereby declare the following to be a clear and exact description of our invention.

Our invention relates to the production of a new urea derivative of amidonaphtholsulfonic acids, being an alkaline salt of an acid having the following formula:

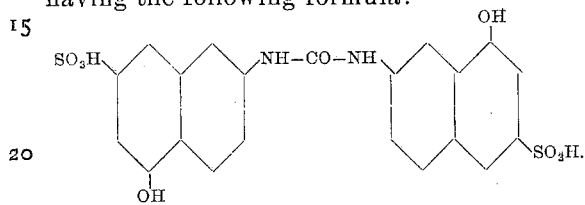

The process for producing this body consists in causing phosgene ($COCl_2$) and a substance adapted to absorb hydrochloric acid to act on an equimolecular mixture of $beta_1$-amido-alpha$_3$-naphthol-beta$_4$-sulfonic acid and of $beta_1$-amido-alpha$_4$-naphthol-beta$_3$-sulfonic acid. A condensation of the two above-named amidonaphtholsulfonic acids with one molecule of phosgene takes place under evolution of two molecules of hydrochloric acid, the above-defined urea derivative being thus formed according to the following equation:

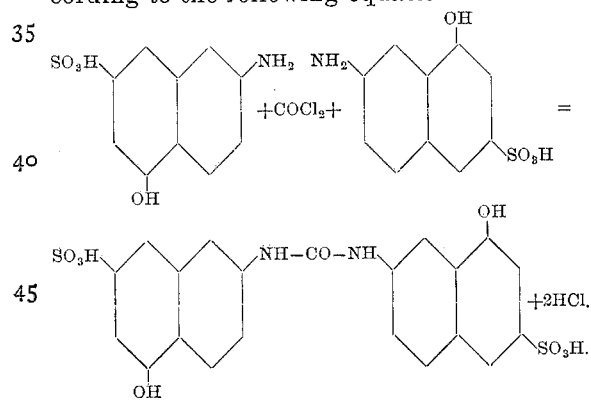

The new urea derivative thus obtained may be employed for the manufacture of valuable azo dyestuffs.

In carrying out our new process practically we can proceed as follows, (the parts being by weight:) Twelve parts of $beta_1$-amido-alpha$_3$-naphthol-beta$_4$-sulfonic acid and twelve parts of $beta_1$-amido-alpha$_4$-naphthol-beta$_3$-sulfonic acid are dissolved in about from four hundred to four hundred and fifty parts of water under the addition of a watery solution containing twenty-four parts of sodium carbonate, ($Na_2CO_3$.) Into the solution thus obtained a current of gaseous phosgene ($COCl_2$) is slowly introduced at ordinary temperature under continuous stirring. The reaction is finished when unchanged amidonaphtholsulfonic acid does not precipitate any more in a test portion on the addition of an excess of diluted hydrochloric acid and the acid liquid thus obtained is not changed by the addition of a small quantity of sodium nitrite. The new urea derivative is precipitated by the addition of common salt, filtered off, pressed, and dried. The sodium salt of the new urea derivative represents a reddish-brown powder, being readily soluble in water and soluble with difficulty in alcohol. From the watery solution the sodium salt is precipitated by the addition of common salt. The barium salt is a grayish powder, which is readily soluble in hot and difficultly soluble in cold water. The corresponding calcium salt represents a grayish powder readily soluble in hot and less soluble in cold water. These salts are prepared by the addition of solutions of $BaCl_2$ or $CaCl_2$ to a watery solution of the sodium salt of the said urea derivative. On boiling the urea derivative with the twentyfold quantity of hydrochloric acid of twenty per cent. it dissolves, and after boiling for some hours the urea derivative is decomposed and the $beta_1$-amido-alpha$_3$-naphthol-beta$_4$-sulfonic acid and $beta_1$-amido-alpha$_4$-naphthol-beta$_3$-sulfonic acid are regenerated.

The new urea derivative is capable of combining with one and likewise with two molecules of diazo compounds, thus furnishing valuable azo dyestuffs.

Having now described our invention and in what manner the same is to be performed, what we claim as new, and desire to secure by Letters Patent, is—

1. The process for producing a new urea derivative of amidonaphtholsulfonic acids by first dissolving an equimolecular mixture of $beta_1$-amido-$alpha_3$-naphthol-$beta_4$-sulfonic acid and $beta_1$-amido-$alpha_4$-naphthol-$beta_3$-sulfonic acid with the addition of sodium carbonate in water, secondly introducing into the solution thus obtained a current of gaseous phosgene ($COCl_2$) and finally isolating the resulting urea derivative, substantially as hereinbefore described.

2. The herein-described new urea derivative which in the form of the free acid has the following formula:

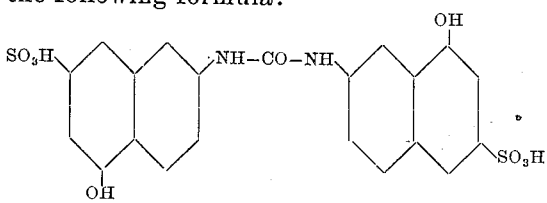

and which in the form of the sodium salt is a grayish powder being capable of combining with one and likewise with two molecules of diazo compounds, being readily soluble in water, very difficultly in alcohol, and which on boiling for some hours with the twentyfold quantity of hydrochloric acid of twenty per cent. is decomposed and $beta_1$-amido-$alpha_3$-naphthol-$beta_4$-sulfonic acid and $beta_1$-amido-$alpha_4$-naphthol-$beta_3$-sulfonic acid being regenerated, substantially as hereinbefore described.

In testimony whereof we have signed our names in the presence of two subscribing witnesses.

ADOLF ISRAEL.
RICHARD KOTHE.

Witnesses:
OTTO KÖNIG,
J. A. RITTERSHAUS.